United States Patent
Bormann et al.

(10) Patent No.: US 10,967,696 B2
(45) Date of Patent: Apr. 6, 2021

(54) ELECTRONIC LEVEL CONTROL DEVICE FOR AIR-SUSPENDED VEHICLES, METHOD AND CONTROL DEVICE FOR ELECTRONIC LEVEL CONTROL

(71) Applicant: WABCO Europe BVBA, Brussels (BE)

(72) Inventors: Dirk Bormann, Algermissen (DE); Jens Gröger, Hannover (DE); Marek Swoboda, Garbsen (DE)

(73) Assignee: Wabco Europe BVBA, Brussels (BE)

( * ) Notice: Subject to any disclaimer, the term of this patent is extended or adjusted under 35 U.S.C. 154(b) by 218 days.

(21) Appl. No.: 16/098,605

(22) PCT Filed: Mar. 10, 2017

(86) PCT No.: PCT/EP2017/000316
§ 371 (c)(1),
(2) Date: Nov. 2, 2018

(87) PCT Pub. No.: WO2017/190818
PCT Pub. Date: Nov. 9, 2017

(65) Prior Publication Data
US 2019/0118606 A1   Apr. 25, 2019

(30) Foreign Application Priority Data
May 4, 2016   (DE) .................. 10 2016 005 539.1

(51) Int. Cl.
*B60G 17/019* (2006.01)
*B60G 11/27* (2006.01)
(Continued)

(52) U.S. Cl.
CPC ........ *B60G 17/01908* (2013.01); *B60G 11/27* (2013.01); *B60G 17/016* (2013.01);
(Continued)

(58) Field of Classification Search
None
See application file for complete search history.

(56) References Cited

U.S. PATENT DOCUMENTS

| 4,017,099 A | * | 4/1977 | Hegel | B60G 17/01933 |
| | | | | 280/6.158 |
| 4,390,187 A | * | 6/1983 | Maeda | B60G 17/0155 |
| | | | | 267/64.22 |

(Continued)

FOREIGN PATENT DOCUMENTS

| DE | 3821569 A1 | 12/1989 |
| DE | 9412038 U1 | 10/1994 |

(Continued)

OTHER PUBLICATIONS

International Search Report for PCT/EP2017/000316 dated Jun. 1, 2017, 4 pages.

(Continued)

*Primary Examiner* — Abdhesh K Jha
(74) *Attorney, Agent, or Firm* — Warner Norcross + Judd LLP

(57) ABSTRACT

Disclosed is an electronic level control device for a vehicle having an air suspension system, for example a trailer vehicle having an air suspension system, the vehicle comprising a chassis having an axle and at least two wheels arranged on the axle, wherein an air spring is arranged between the axle and the chassis for at least one of the wheels, wherein an electronic control unit can initiate a level controlling procedure by actuating a solenoid valve, and wherein at least one capacitive level sensor is provided for the axle. The distance between the chassis and the at least one axle can be determined by the level sensor.

11 Claims, 2 Drawing Sheets

(51) Int. Cl.
  *B60G 17/015* (2006.01)
  *B60G 17/016* (2006.01)
  *B60G 17/04* (2006.01)

(52) U.S. Cl.
  CPC ....... *B60G 17/019* (2013.01); *B60G 17/0155* (2013.01); *B60G 17/0416* (2013.01); *B60G 2202/152* (2013.01); *B60G 2400/25* (2013.01); *B60G 2400/252* (2013.01); *B60G 2401/25* (2013.01)

(56) References Cited

U.S. PATENT DOCUMENTS

| | | | |
|---|---|---|---|
| 4,634,143 | A | 1/1987 | Asami et al. |
| 4,961,055 | A | 10/1990 | Habib et al. |
| 5,461,564 | A | 10/1995 | Collins et al. |
| 2003/0075882 | A1 | 4/2003 | Delorenzis et al. |
| 2005/0040573 | A1 | 2/2005 | Bolt et al. |
| 2018/0003521 | A1 | 1/2018 | Bormann et al. |

FOREIGN PATENT DOCUMENTS

| | | |
|---|---|---|
| DE | 4192969 C2 | 7/1995 |
| DE | 4415760 C1 | 8/1995 |
| DE | 19526077 A1 | 2/1996 |
| DE | 102007020043 A1 | 10/2008 |
| DE | 102015000380 A1 | 7/2016 |
| EP | 0534645 A1 | 3/1993 |
| EP | 1980426 A2 | 10/2008 |

OTHER PUBLICATIONS

English language abstract and machine translation for DE3821569 (A1) extracted from http://worldwide.espacenet.com database on Sep. 20, 2018, 11 pages.

English language abstract and machine translation for DE9412038 (U1) extracted from http://worldwide.espacenet.com database on Sep. 21, 2018, 11 pages.

English language abstract and machine translation for DE4192969 (C2) extracted from http://worldwide.espacenet.com database on Sep. 21, 2018, 7 pages.

English language abstract and machine translation for DE4415760 (C1) extracted from http://worldwide.espacenet.com database on Sep. 21, 2018, 7 pages.

English language abstract and machine translation for DE102007020043 (A1) extracted from http://worldwide.espacenet.com database on Sep. 21, 2018, 20 pages.

Danilevich, Anatoly et al "Verschiedene Methoden zur Kapazitätsbestimmung", 2006, 40 pages, (11-25).

* cited by examiner

ELECTRONIC LEVEL CONTROL DEVICE FOR AIR-SUSPENDED VEHICLES, METHOD AND CONTROL DEVICE FOR ELECTRONIC LEVEL CONTROL

CROSS-REFERENCE TO RELATED APPLICATIONS

This application is a national phase entry of PCT/EP2017/000316, filed Mar. 10, 2017, which claims priority to German Patent Application No. 10 2016 005 539.1, filed May 4, 2016, both of which are incorporated herein by reference in their entirety.

FIELD OF THE INVENTION

The invention relates to an electronic level control device for a vehicle having an air suspension system, by way of example for a trailer vehicle having an air suspension system.

BACKGROUND OF THE INVENTION

An electronic level control device of this type is described in the WABCO publication "Electronically Controlled Air Suspension (ECAS) for Trailers, $3^{rd}$ edition." In the case of this level control device, a travel sensor is fastened to the vehicle body and is connected via a lever system to the vehicle axle. The travel sensor ascertains in determined time intervals the distance between the axle and the vehicle body. The time intervals depend by way of example on the operating mode (driving operation or charging operation) of the vehicle. The determined measured value is the actual value of a control circuit that is relayed to an electronic control device. This actual value is compared in the electronic control device with a desired value that is stored in the control device. In the case of an inadmissible difference between the actual value and the desired value, an adjustment signal is transmitted to a solenoid valve of the electronic level control device. The solenoid valve actuates the air springs of the vehicle depending upon this adjustment signal and aerates or vents said air springs. The distance between the vehicle axle and the vehicle body changes as a result of this pressure change in the air springs. The distance is ascertained again by means of the travel sensor and the cycle starts from the beginning.

Details regarding the travel sensor are not provided in the mentioned publication but information relating to a method and a device for calibrating the level of a vehicle is found in DE19526077 C2 according to which different types of position sensors can be used that can be either variable electrical resistors, variable magnetic resistors, variable capacitances or Hall effect sensors. These position sensors can be configured to operate in a manner that requires physical contact or in a manner that does not require physical contact. DE10,2007/020043 A1 discloses level sensors that operate in an optical manner but all of these level sensors are components that are produced separately and are arranged between a chassis and an axle or are integrated respectively in an air spring.

SUMMARY OF THE INVENTION

Embodiments of the invention provide a vehicle having an air suspension system with an electronic level control device that utilizes a level sensor that operates in a capacitive manner and is not provided as a separate component that requires mounting. Moreover, embodiments of the invention provide a method for performing an electronic level controlling procedure, wherein the method can function without a capacitive level sensor that is provided as a separate component.

Accordingly, in one embodiment, the invention relates to an electronic level control device for a vehicle having an air suspension system, for example for a trailer vehicle having an air suspension system, the vehicle comprising a chassis having at least one axle, wherein at least two wheels are arranged on the at least one axle, wherein an air spring is arranged between the axle and the chassis for at least one of the wheels, wherein an electronic control unit can initiate a level controlling procedure by actuating a solenoid valve, wherein the solenoid valve can supply compressed air to the air spring from a compressed air storage device or can discharge compressed air from the air spring into the atmosphere so as to perform the level controlling procedure, wherein at least one capacitive level sensor is provided for the at least one axle, and the distance between the chassis and the at least one axle can be determined by the level sensor.

In certain embodiments, the capacitive level sensor comprises a variable capacitance and is formed by the chassis together with the at least one axle.

Accordingly, the variable distance between the chassis and a chassis axle of a vehicle can be determined without a distance sensor that is produced and assembled separately. On the contrary, the capacitive level sensor is formed in its sensor elements by two components that are already provided on the vehicle.

In accordance with one embodiment, the chassis together with the at least one axle forms a capacitor that has an electrical capacitance that varies depending upon the reciprocal distance between the axle and chassis, wherein this variable electrical capacitance can be measured by an electric circuit, and that the electronic control unit is configured to use the determined value of the variable electrical capacitance to generate a control signal for actuating the solenoid valve.

In these and other embodiments, the invention is based on the consideration that galvanically isolated components that are spaced apart from one another in a variable manner fundamentally form a capacitor having an electrical capacitance that is dependent upon the reciprocal distance between the components. The smaller the distance between the galvanically isolated components, the greater the electrical capacitance of the capacitor. This also applies for the chassis of a vehicle having an air suspension system with respect to an axle that is galvanically isolated from the chassis with the result that it is sufficient to measure the capacitance of this capacitor depending upon the distance between the chassis and the axle in order to derive a control signal for the level controlling procedure from the measurement. It follows from this that the chassis and the axle form the basic elements of a capacitive level sensor and the variable electrical capacitance of the level sensor depending upon the reciprocal distance between the chassis and axle can be used as an output value to generate a control signal for the level controlling procedure.

In accordance with a further embodiment, in order to generate this control signal, an electric circuit is integrated into the electronic control unit, the electric circuit comprising a DC voltage source for periodically generating a square wave voltage U1, a charging resistor R1 and a time-voltage measuring unit. The electric circuit can be used to determine the time period Δt that elapses between the start of applying the square wave voltage U1, which is supplied via the charging resistor R1, to the capacitor having the electrical capacitance C2, that varies depending upon the distance, and until achieving a predetermined charging voltage value U2 at this capacitor. In the electronic control unit, with the aid of the formula $C2=(R1/\Delta t-1/C1)^{-1}$ [nF], the value of the electrical capacitance C2 of the capacitor when the determined time period $\Delta t$ [s] has elapsed can be calculated, wherein the constant electrical capacitance C1 of other capacitive elements connected in series to the capacitor are taken into account. Value pairs of different capacitances C2 of the capacitor having allocated distances D of the chassis with respect to the axle are stored in the electronic control unit. The control unit is constructed in such a manner that, using the control unit, a current value that has been determined for the capacitance C2 of the capacitor can be used to detect the allocated distance value for the current distance D between the chassis and the axle. The control unit is constructed in such a manner that, using the control unit, a control signal for actuating the solenoid valve can be generated by comparing the determined current distance D with a desired distance value.

In accordance with one embodiment, the predetermined charging voltage value U2 that determines the expiration of the time period $\Delta t$ is 0.67 times the maximum value of the applied square wave voltage U1. Since the capacitor having the distance-dependent, and therefore variable, capacitance C2 is electrically charged following an asymptotic curve, this value has proven advantageous which will be further explained later.

Furthermore, in these and other embodiments, a rotational speed sensor is arranged on the at least one axle for each wheel respectively so as to emit rotational speed signals for an anti-lock brake system or an electronic brake system. These rotational speed sensors respectively form a constant capacitive element that can be measured, and is connected in series to the capacitor. The rotational speed signals of the rotational speed sensors and the voltage measured values U in the electric circuit can be used to determine the capacitance, and are separate from one another in the electronic control unit for further processing.

In these and other embodiments, additional components and cabling are not required by virtue of using a rotational speed sensor that is already present, and the signals from the rotational speed sensor arrive via electrical lines at the electronic control unit so as to also convey the information regarding the level of the charging voltage. It is only necessary to configure the electronic control unit for the separate processing of the rotational speed signals and the charging voltage signals.

In these and other embodiments, the electrical capacitance C2 that varies with the distance D between the chassis and the at least one axle can be determined by the measurement of the time period $\Delta t$ that elapses prior to achieving a previously set electrical charging voltage U2 in the case of a charging procedure or a discharging procedure. Optionally, this electrical capacitance C2 can also be determined by a known resonance frequency measurement in a resonance-capable LC circuit, wherein the LC circuit is known to comprises a coil L and a capacitor C. The capacitor is then likewise provided by the chassis and the at least one axle of the vehicle. Moreover, the electrical capacitance C2 that varies with the distance D between the chassis and the at least one axle can be determined by a measurement of the current curve when applying an alternating voltage.

In accordance with a further embodiment, a method for electronically controlling the level of a vehicle having an air suspension system, for example a trailer vehicle having an air suspension system, is provided, the vehicle comprising at least one axle and two wheels, wherein an air spring for at least one of the wheels is arranged between the axle and the chassis, and in which method an electronic control unit initiates a level controlling procedure by actuating a solenoid valve, wherein the solenoid valve supplies compressed air to the air spring from a compressed air storage device or discharges compressed air from the air spring into the atmosphere so as to perform the level controlling procedure, comprising the following steps:

determining a capacitance of a capacitor, the capacitance being variable depending upon the distance D between the axle and the chassis, wherein the chassis together with the at least one axle forms the capacitor, generating a control signal, which is dependent upon the variable capacitance, for actuating the solenoid valve so as to perform the level controlling procedure.

Accordingly, the procedure for generating a control signal for actuating the solenoid valve so as to perform the level controlling procedure in accordance with the method can be performed merely by determining the variable capacitance of a capacitor, the capacitance being dependent upon the distance D between the axle and the chassis and the capacitor being formed by the chassis and at least one axle of a vehicle.

In a further embodiment of this method, this method can comprise the following further method steps:

periodically generating a square wave voltage by an electric circuit, wherein the electric circuit comprises a DC voltage source, a charging resistor R1 and a time-voltage measuring unit, wherein the electric circuit is used to determine the increase in a charging voltage that reaches the capacitor that is formed by the chassis and the axle over the time and also depending upon the capacitance of the capacitor and therefore depending upon the distance D between the axle and the chassis, when the vehicle is in operation, periodically calculating the current distance-dependent capacitance C2 of the capacitor using the formula $C2=(R1/\Delta t-1/C1)^{-1}$ [nF], wherein $\Delta t$ [s] is the measured period of time prior to reaching a predetermined voltage value U2 [V] of the square wave voltage U1 [V], and wherein the constant electrical capacitance C1 of other capacitive elements that are connected in series to the capacitor is taken into account, and adjusting a predetermined desired distance between the chassis and the axle whilst drawing upon stored value pairs for the variable capacitance and the respective allocated distance value.

In these and other embodiments, in order to calibrate the level control device, a calibrating procedure is performed by;

measuring the constant capacitance C1 of another capacitive element that is formed by a rotational speed sensor that is connected in series to the capacitor that is formed by the chassis and the axle, and storing the value of the measured constant capacitance C1 in the control unit, and measuring value pairs of the capacitance C2 of the capacitor that is formed by the chassis and the axle, and the respective value that is set for the distance D in the case of different distances D of the chassis from the axle, and storing the value pairs in the control unit.

Furthermore, in these and other embodiments, in order to calculate the current capacitance C2 of the capacitor that is formed by the chassis and the axle, the duration of the time period Δt that has elapsed from applying the square wave voltage U1 until achieving a charging voltage value U2 is drawn upon, the charging voltage value corresponds to 0.67 times the maximum of the square wave voltage U1.

Moreover, in accordance with these and other embodiments of the method, the distance D between the chassis and the axle is determined only on one of the axles of the vehicle, and this determined distance D is used by the electronic control unit for the same and simultaneous level controlling procedure of other axles of the vehicle.

Finally, some embodiments of the invention relate to a control device for implementing the described method, the control device being configured in accordance with at least one of the device claims.

BRIEF DESCRIPTION OF THE DRAWINGS

The invention is described in greater detail below with reference to the accompanying figures, in which.

DETAILED DESCRIPTION

Figure 1:
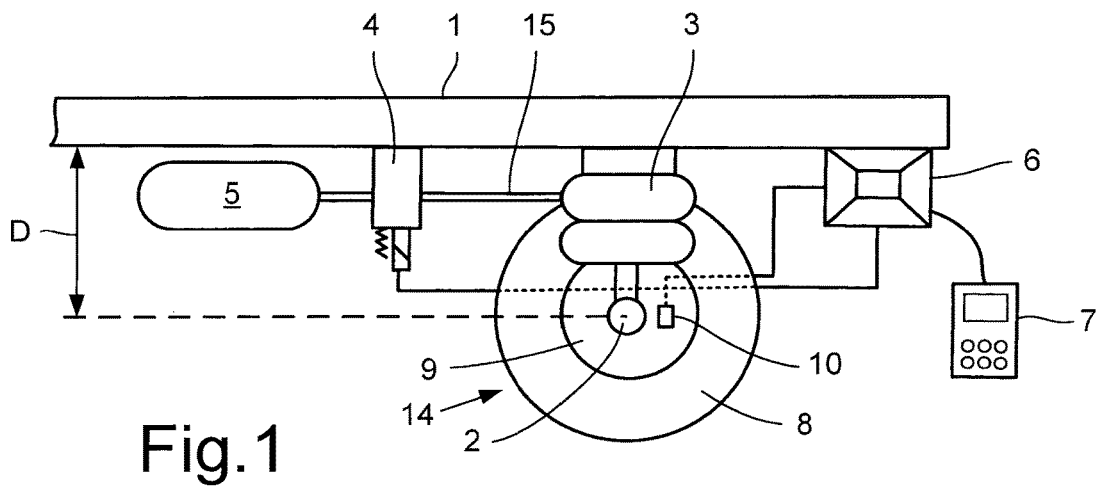
FIG. 1 is a sectional schematic view of a vehicle having an axle and an air suspension system.

With reference to the figures, FIG. 1 illustrates schematically a section of a chassis 1 of a vehicle having air suspension system, in particular a trailer vehicle having an air suspension system. The chassis 1 is connected to at least one axle 2 via, respectively, one air spring 3 per vehicle wheel 14. Each of the vehicle wheels 14 comprises a tire 8 and a rim 9, with the result that the axle 2 and the chassis 1 are electrically insulated from the road or from roadway elements. A distance D of the axle 2 from the chassis 1 can be set by an electronic control unit 6 to desired values that can be predetermined. For this purpose, the control unit 6, after using information regarding the current distance D, transmits signals to a solenoid valve 4 that is arranged in a pneumatic connecting line 15 between a compressed air storage device 5 and the air springs 3. Depending upon the respective set desired level and in the case of fluctuations in the distance D, the solenoid valve supplies compressed air from the compressed air storage device 5 to the air springs 3 or discharges compressed air from the air springs 3 into the atmosphere. This level controlling procedure is normally performed automatically with reference to data and control programs that are stored in the electronic control unit 6, but it is also possible to provide an operating unit 7 that is operated manually and can be used to input desired data for the desired distance D into the control unit 6.

The electronic control unit 6 can be an engine control unit or, as in the present embodiment, an axle modulator. It is also possible to integrate an anti-lock system in such an engine control unit or in an axle modulator or also in an electronic brake system, and for this reason a rotational speed sensor 10 is provided on the axle 2 for each vehicle wheel 14. This rotational speed sensor 10 transmits rotational speed signals to an anti-lock system or an electronic brake system so as to actuate the wheel brakes in order to prevent the wheels locking when the service brake of the vehicle is actuated.

Figure 2:
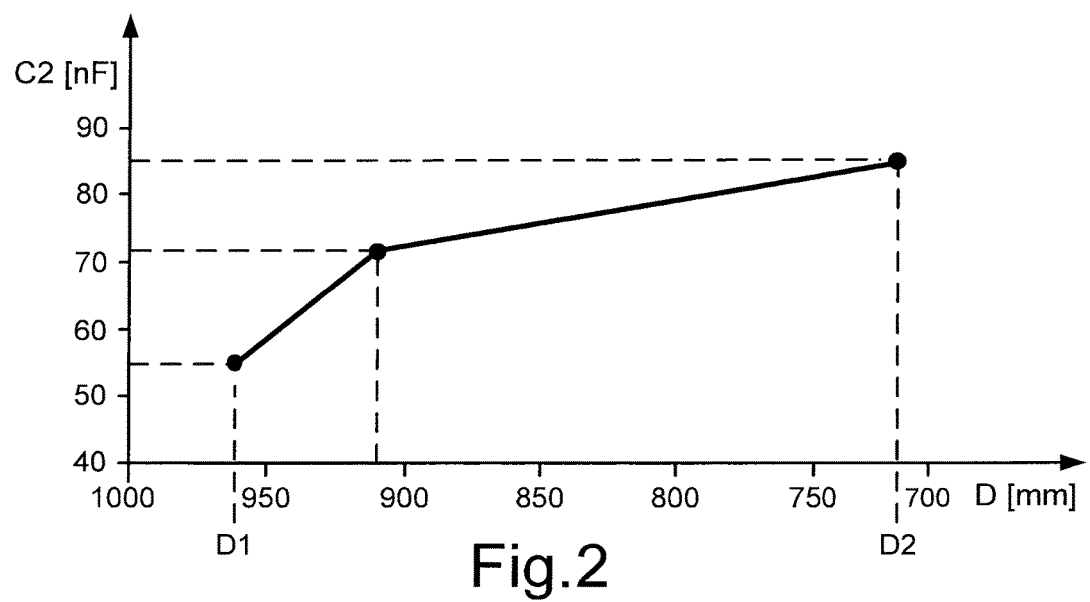
FIG. 2 illustrates schematically the electrical capacitance C2 of a capacitor that is formed by the chassis and an axle of the vehicle having an air suspension system, the electrical capacitance C2 depending upon the distance D between the chassis and axle.

The diagram in accordance with FIG. 2 illustrates that the distance-dependent, and therefore variable, electrical capacitance C2 of a capacitor 13 that is formed by the chassis 1 and the axle 2 increases starting from a minimum value in the case of a maximum distance D1 of the axle 2 from the chassis 1 over an average value to a maximum value in the case of a minimum distance D2.

Figure 3:
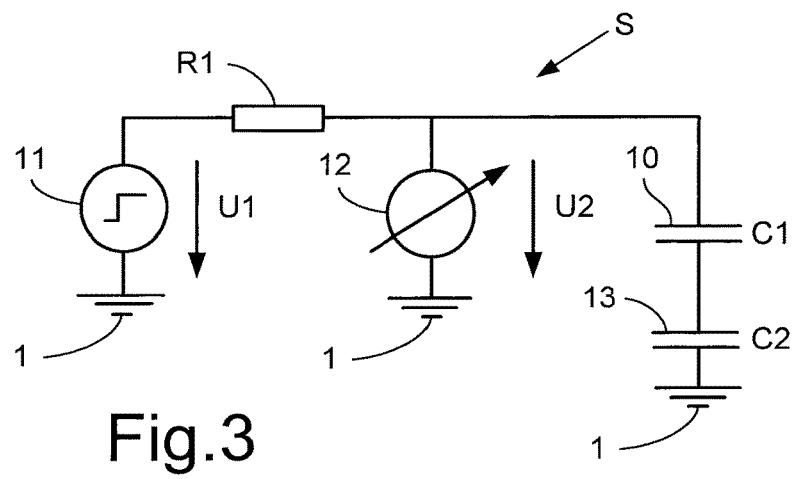
FIG. 3 is a schematic diagram of a circuit for measuring the distance-dependent electrical capacitance C2.

FIG. 3 illustrates a schematic diagram of a circuit S for measuring the variable capacitance C2 of the capacitor 13 that is formed by the chassis 1 and the axle 2 that is galvanically isolated from the chassis 1. A further capacitor 10 having a constant electrical capacitance C1 that can be measured in a known manner is connected in series to this capacitor 13, the further capacitor 10 being formed in this embodiment by the above-mentioned rotational speed sensor 10 for the vehicle wheel 14.

Figure 4:
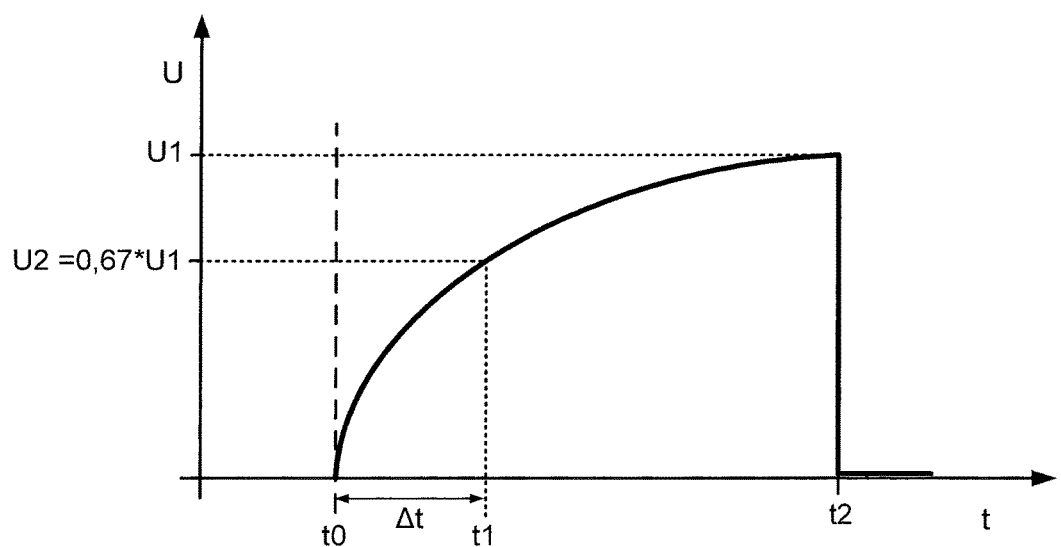
FIG. 4 is a diagram of the charging voltage curve over the time t at the capacitor that is formed by the chassis and the axle.

The capacitors that are connected in series, namely the capacitor that is formed by the rotational speed sensor 10 and that has the constant capacitance C1, and the capacitor 13 that is formed by the chassis 1 and the axle 2 and that has the distance-dependent capacitance C2, can be charged via a charging resistor R1 by a DC voltage source 11 that periodically generates a square wave voltage U1. A charging voltage curve U=f (t) in relation to this is illustrated in FIG. 4. As shown in FIG. 4, the increase of the charging voltage U does not occur instantaneously to the maximum value of the applied square wave voltage U1, but rather that a specific time period Δt from a point in time t0 to a point in time t1 is necessary to reach a predetermined charging voltage U2. At a later point in time t2, the charging voltage increase periodically drops to zero. Since the charging voltage U approaches the applied square wave voltage U1 in an asymptotic manner, only the period of time Δt between the point in time t0 of the start of the charging period of time and achieving a predetermined charging voltage value U2 is measured by a time-voltage measuring unit 12, the charging voltage value U2 amounting in this exemplary embodiment to 0.67 times the maximum voltage value of the applied square wave voltage U1. This value of the charging voltage U2=0.67*U1 represents a good compromise between a charging voltage value that can be measured comparatively effectively and a comparatively short measuring time.

The variable capacitance of the capacitor 13 that is formed by the chassis 1 and the axle 2 can be calculated using the formula $C2=(R1/\Delta t - 1/C1)^{(-1)}$, wherein R1 is the previously known electrical resistance [Ω] of the charging resistor R1, Δt is the time period [s] prior to achieving the charging voltage U2=U1*0.67 [V], and C1 is the previously known constant capacitance [nF] of the rotational speed sensor 10. The voltage source 11, the time-voltage measuring unit 12 and the two series-connected capacitors 10, 13 that have a constant capacitance C1 or have a distance-dependent capacitance C2 lie respectively with a pole against the chassis 1, which forms the ground pole in the vehicle. The distance D between the chassis 1 and the axle 2 can be selected from a table that is stored in the control device 6 using the respective current value for the distance-dependent variable electrical capacitance C2, which is determined with the aid of the above-mentioned formula. This distance value D is then used by the control device 6 for the described actual value-desired value comparison, after which a control signal for the solenoid valve 4 is generated or not generated. The table having the value pairs for the distance D between the chassis 1 and the axle 2 and the associated value for the capacitance C2 can be set in a calibrating phase and stored in the control device 6.

Figure 5:
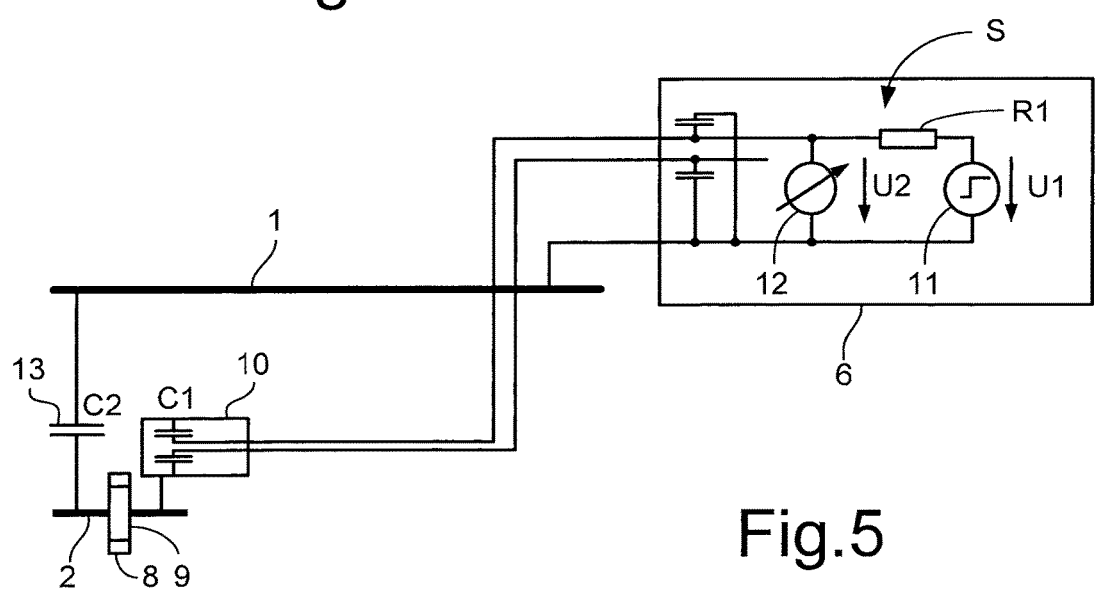
FIG. 5 is a schematic diagram of a circuit for measuring the distance-dependent electrical capacitance C2 of the capacitor that is formed by the chassis and the axle, with the use of a rotational speed sensor for a wheel on the axle of the vehicle having an air suspension system.

The detailed schematic circuit diagram in accordance with FIG. 5 illustrates the chassis 1, simplified as a bold line, the schematically illustrated axle 2, and also the vehicle wheel 14 that comprises the tire 8 and the rim 9. The capacitor 13 that is formed by the chassis 1 and the axle 2 and that has the distance-dependent capacitance C2 is marked schematically as an electronic component between the chassis 1 and the axle 2. The capacitor that is formed by the rotational speed sensor 10 and that has a constant capacitance C1 is connected via electrical lines to the electronic control unit 6. The electric circuit S is integrated into the control unit, the electric circuit S comprising, and optionally consisting of, the DC voltage source 11 for periodically generating a square wave voltage U1, the charging resistor R1 and the time-voltage measuring unit 12.

The procedure of periodically charging the capacitor 13 that is formed by the chassis 1 and the axle 2 and that has the distance-dependent capacitance C2 and the capacitor that is formed by the rotational speed sensor 10 and is connected in series to the capacitor 13 and that has the constant capacitance C1 is performed by the electronic control unit 6. Moreover, the electronic control unit 6 is configured to separate the speed signals of the rotational speed sensor 10 and the charging voltage signals of the electric circuit S from the DC voltage source 11, the time-voltage measuring unit 12 and the charging resistor R1 from one another for further processing. An algorithm is stored in the control unit 6 and, using the algorithm, the current value of the variable capacitance C2 of the capacitor 13 that is formed by the chassis 1 and the axle 2 can be determined in accordance with the previously mentioned formula, $C2=(R1/\Delta t-1/C1)^{-1}$ [nF].

Every time a measurement is performed, the capacitor 13 that is formed by the chassis 1 and the axle 2 and also the capacitor that is formed by the rotational speed sensor 10 are initially discharged, and the square wave voltage U1 is then applied after a short time periodically in the circuit S, with the result that it is possible in this manner to measure the period of time $\Delta t$ prior to achieving a charging voltage having the value $U2=U1*0.67$ and also to calculate the respective current capacitance C2.

In order to correlate the distance D between the chassis 1 and the axle 2 with respect to the electrical capacitance C2 of the capacitor 13 that is formed by the chassis 1 and the axle 2 in a calibrating procedure, in the case of a vehicle that is at a standstill, measurements are performed by the circuit that is illustrated in FIG. 5 in the case of different distances D that are set between the chassis 1 and the axle 2. The respective period of time $\Delta t$ prior to achieving the predetermined charging voltage value U2 is determined, subsequently the capacitance C2 is calculated using the formula $C2=(R1/\Delta t-1/C1)^{-1}$, and finally the associated value pairs of the distance D and capacitance C2 are input into the diagram in accordance with FIG. 2 or into a table in the control unit 9 and stored in the diagram or table.

In the example illustrated in FIG. 2, the maximum value of the capacitance amounts to C2=85 nF in the case of a distance D2=710 mm in the lowest position of the chassis 1 with respect to the axle 2. The minimum value of the capacitance C2=56 nF is achieved in the case of a maximum distance D=960 mm. In the case of an intermediate distance of D1=910 mm lying between the chassis 1 and the axle 2, a capacitance of C2=73 nF is determined. Intermediate values are interpolated and likewise stored.

By virtue of periodically applying the square wave voltage U1 to the capacitor that is formed by the rotational speed sensor 10 and that has the constant capacitance C1 and periodically applying the square wave voltage U1 to the capacitor 13 that is formed by the chassis 1 and the axle 2, is connected in series to the capacitor 10 and has the variable capacitance C2, it is possible to determine the charging time periods $\Delta t$ that elapse prior to achieving the charging voltage $U2=U1*0.67$ and the current distance values D therefrom, and, in the case of a deviation from a selected desired value, perform corrections of the distance D by the electronic level controlling procedure.

FIGS. 1 to 5 are only schematic in order to illustrate the measuring principle that is the basic idea of the invention. The description of the principle provides the person skilled in the art with the information that he requires in order to construct the real electric circuits using his expertise and to program the function of the electronic control unit 6 to determine distance correcting values for the distance D in order to be able to perform the corresponding corrections by the electronic control unit 6.

The invention is not limited to vehicles having an air-suspension system, in particular trailer vehicles having an air suspension system and rigid axles 2, but rather the invention also relates to vehicles having an air suspension system with individual wheel suspension arrangements, by way of example passenger cars in which one distance measurement in accordance with the invention using a rotational speed sensor 10 is provided at each wheel suspension arrangement.

The contacting arrangement of the proposed measuring circuit is provided in the exemplary embodiments via the rotational speed sensor 10. It is assumed that the coupling between the electrical interior of the rotational speed sensor 10 and its housing is capacitive, with the result that the constant electrical capacitance C1 that is present there is connected in series to the capacitance C2 that varies depending upon the distance D and that is to be actually measured. Alternatively, the coupling between the electrical interior of the rotational speed sensor 10 and its housing is ohmic, wherein a device and a method can be used that are described in DE10,2015/000380 A1, assigned to the applicant, which is incorporated herein by reference in its entirety. In lieu of measuring the capacitance C2 that varies depending upon the distance D, optionally an impedance that varies depending upon the distance can be measured, the impedance optionally being capacitive or ohmic.

All the features mentioned in the above description of the figures, in the claims and in the description introduction can be used both individually as well as in an arbitrary combination with one another. The invention is consequently not limited to the described and claimed combinations of features, on the contrary all combinations of the features are to be considered as disclosed.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated.

On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. An electronic level control device for a vehicle having an air suspension system, said vehicle comprising a chassis having at least one axle, at least two wheels arranged on the at least one axle, and an air spring arranged between the at least one axle and the chassis for at least one of the at least two wheels, the electronic level control device comprising:
an electronic control unit configured to initiate a level controlling procedure by actuating a solenoid valve of the air spring to supply compressed air to the air spring from a compressed air storage device and/or discharge compressed air from the air spring into the atmosphere so as to perform the level controlling procedure; and
at least one capacitive level sensor comprising a variable capacitance, wherein said capacitive level sensor is configured to determine a distance between the chassis and the at least one axle based on the variable capacitance, the at least one capacitive level sensor further comprising a capacitor formed by the chassis and the at least one axle, wherein the variable capacitance varies depending upon the distance between the chassis and the at least one axle; and
the electronic control unit including an electric circuit comprising a DC voltage source, a charging resistor, and a time-voltage measuring unit,
wherein the electric circuit is configured to: generate a square wave voltage: determine a time period that elapses between applying the square wave voltage and achieving a predetermined charging voltage value at the capacitor, and calculate a current capacitance of the capacitor by the formula: $C2=(R1/\Delta t-1/C1)^{-1}$ wherein C2 is the current capacitance of the capacitor, R1 is a previously known electrical resistance of the charging resistor, $\Delta t$ is the determined time period, and C1 is a constant capacitance of other capacitive elements connected in series to the capacitor, and wherein the electronic control unit is configured to generate a control signal for actuating the solenoid valve based on a value of the variable capacitance and wherein variable capacitance is the calculated current capacitance of the capacitor (C2).

2. The electronic level control device as claimed in claim 1, further comprising value pairs of different capacitance values of the capacitor and associated distance values between the chassis and the at least one axle, wherein the value pairs are stored in the electronic control unit, wherein the electronic control unit is configured to generate the control signal on one of the value pairs corresponding to the current capacitance.

3. The electronic level control device as claimed in claim 1, wherein the electronic control unit is configured to determine a current distance between the chassis and the at least one axle based on the current capacitance, and wherein the electronic control unit is configured to generate the control signal based on a comparison of the current distance to a desired distance stored in the electronic control unit.

4. The electronic level control device as claimed in claim 1, wherein the predetermined charging voltage value is 0.67 times the square wave voltage.

5. The electronic level control device as claimed in claim 1, wherein a rotational speed sensor is arranged on the at least one axle for each of the at least two wheels and comprises a constant capacitive element connected in series to the capacitor.

6. A method for electronic level control of a vehicle having an air suspension system, said vehicle comprising a chassis having at least one axle, two wheels arranged on the at least one axle, and an air spring for at least one of the wheels arranged between the at least one axle and the chassis, the method comprising:
initiating, by an electronic control unit, a level controlling procedure comprising one of:
supplying compressed air to the air spring from a compressed air storage device; or discharging compressed air from the air spring into the atmosphere;
determining a capacitance of a capacitor, said capacitance being variable in dependence upon a distance between the at least one axle and the chassis, wherein the chassis together with the at least one axle forms the capacitor;
generating a square wave voltage by an electric circuit, wherein the electric circuit comprises a DC voltage source, a charging resistor, and a time-voltage measuring unit; and determining, using the electric circuit, a time period that elapses between applying the square wave voltage and achieving a predetermined charging voltage value at the capacitor; wherein determining the capacitance of the capacitor comprises calculating a current capacitance of the capacitor by the formula: $C2=(R1/\Delta t-1/C1)^{-1}$ wherein C2 is the current capacitance of the capacitor, R1 is a previously known electrical resistance of the charging resistor, $\Delta t$ is the determined time period, and C1 is a constant capacitance of other capacitive elements connected in series to the capacitor and generating a control signal for actuating a solenoid valve to initiate the level controlling procedure based on the determined current capacitance of the capacitor (C2).

7. The method as claimed in claim 6, further comprising adjusting the distance between the chassis and that least one axle based upon value pairs stored by the electronic control unit for the current capacitance and an associated distance value.

8. The method as claimed in claim 6, further comprising determining a current distance between the chassis and the at least one axle based on the current capacitance, wherein the control signal is based on a comparison of the current distance to a desired distance stored in the electronic control unit.

9. The method as claimed in claim 6, further comprising calibrating the electronic control unit by:
  measuring the constant capacitance of other capacitive elements connected in series to the capacitor by measuring the constant capacitance of a rotational speed sensor connected in series to the capacitor, and storing the value of the measured constant capacitance in the electronic control unit; and
  measuring the value of the capacitance of the capacitor at different distance values between the at least one axle and the chassis, and storing the capacitance and distance values as value pairs in the electronic control unit.

10. The method as claimed in claim 6, wherein the predetermined charging voltage value is 0.67 times the square wave voltage.

11. The method as claimed in claim 6, wherein the vehicle comprises at least one other axle, wherein initiating the level controlling procedure comprises initiating a simultaneous level controlling procedure for both axles of the vehicle based on the determined capacitance.

* * * * *